United States Patent
Zhou et al.

(10) Patent No.: US 12,069,685 B2
(45) Date of Patent: Aug. 20, 2024

(54) WIRELESS COMMUNICATION METHOD, DEVICE, AND SYSTEM

(71) Applicant: HUAWEI TECHNOLOGIES CO., LTD., Guangdong (CN)

(72) Inventors: Han Zhou, Shanghai (CN); Xiaolei Tie, Shanghai (CN); Wenwen Huang, Shanghai (CN); Zhanzhan Zhang, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 365 days.

(21) Appl. No.: 17/563,587

(22) Filed: Dec. 28, 2021

(65) Prior Publication Data

US 2022/0124785 A1 Apr. 21, 2022

Related U.S. Application Data

(63) Continuation of application No. PCT/CN2020/098366, filed on Jun. 28, 2020.

(30) Foreign Application Priority Data

Jun. 28, 2019 (CN) .......................... 201910579904.7
Feb. 14, 2020 (CN) .......................... 202010093704.3

(51) Int. Cl.
*H04W 72/23* (2023.01)
*H04W 72/044* (2023.01)
*H04W 72/1273* (2023.01)

(52) U.S. Cl.
CPC ......... *H04W 72/23* (2023.01); *H04W 72/044* (2013.01); *H04W 72/1273* (2013.01)

(58) Field of Classification Search
CPC .............. H04W 72/23; H04W 72/044; H04W 72/1273; H04W 52/0216; H04W 52/0225; H04W 72/0453; Y02D 30/70
See application file for complete search history.

(56) References Cited

U.S. PATENT DOCUMENTS

2019/0082431 A1   3/2019   Yi et al.
2019/0253230 A1*  8/2019   Loehr ............... H04W 72/0453
(Continued)

FOREIGN PATENT DOCUMENTS

CN      108886804 A     11/2018
CN      109586881 A     4/2019
(Continued)

OTHER PUBLICATIONS

Extended European Search Report issued in European Application No. 20832626.4 on Jun. 28, 2022, 9 pages.
(Continued)

*Primary Examiner* — Dady Chery
(74) *Attorney, Agent, or Firm* — Fish & Richardson P.C.

(57) ABSTRACT

Embodiments of this application provide a wireless communication method, device, and system. The method includes: A terminal device receives first information from a network device, where the terminal device currently uses a first BWP, and the first information indicates that in minK0 time units after the terminal device receives scheduling downlink control information (DCI), there is no downlink shared channel (PDSCH) scheduled by the scheduling DCI, and/or in minK2 time units after the terminal device receives the DCI, there is no physical uplink shared channel (PUSCH) scheduled by the scheduling DCI; the terminal device receives the scheduling DCI from the network device, where the scheduling DCI indicates the terminal device to switch from the first BWP to a target BWP; and the terminal device determines a first time period based on a bandwidth part (BWP) switch delay and the first information, where the BWP switch delay includes N time units.

20 Claims, 6 Drawing Sheets

(56) References Cited

U.S. PATENT DOCUMENTS

| | | | | |
|---|---|---|---|---|
| 2020/0145982 A1* | 5/2020 | Cheng | ............ | H04L 5/0023 |
| 2020/0314881 A1* | 10/2020 | Bagheri | ............ | H04W 72/23 |
| 2021/0360683 A1* | 11/2021 | Chen | ............ | H04L 5/0053 |

FOREIGN PATENT DOCUMENTS

| | | |
|---|---|---|
| CN | 109788553 A | 5/2019 |
| EP | 3478019 A1 | 5/2019 |
| WO | 2018204922 A1 | 11/2018 |

OTHER PUBLICATIONS

MediaTek Inc., "BWP Switching Delay," 3GPP TSG-RAN WG4 Meeting #AH 1807, R4-1808836, Montreal, Canada, Jul. 2-6, 2018, 6 pages.

Qualcomm Incorporated, "Cross-slot scheduling power saving techniques," 3GPP TSG-RAN WG1#97, R4-1808836, Reno, USA, May 13-17, 2019, 16 pages.

Qualcomm Incorporated, "Remaining Issues on BWP," 3GPP TSG RAN WG1 Meeting AH 1801, R1-1800879, Vancouver, Canada, Jan. 22-26, 2018, 13 pages.

Apple Inc., "Cross Slot Scheduling for UE Power Saving," 3GPP TSG RAN WG1 #96bis, R1-1904986, Xi'an, China, Apr. 8-12, 2019, 9 pages.

MediaTek Inc., "Summary of Cross-slot Scheduling Power-Saving Techniques," 3GPP TSG RAN WG1 Meeting #97, R1-1907840, Reno, NV, USA, May 13-17, 2019, 26 pages.

PCT International Search Report and Written Opinion issued in International Application No. PCT/CN2020/098366 on Sep. 17, 2020, 13 pages (with English translation).

* cited by examiner

WIRELESS COMMUNICATION METHOD, DEVICE, AND SYSTEM

CROSS-REFERENCE TO RELATED APPLICATIONS

This application is a continuation of International Application No. PCT/CN2020/098366, filed on Jun. 28, 2020, which claims Chinese Patent Application No. 201910579904.7, filed on Jun. 28, 2019 and Chinese Patent Application No. 202010093704.3 filed on Feb. 14, 2020. All of the aforementioned patent applications are hereby incorporated by reference in their entireties.

TECHNICAL FIELD

This application relates to the field of wireless communications, and more specifically, to a wireless communication method, device, and system.

BACKGROUND

Compared with a long term evolution (Long Term Evolution, LTE) system, new radio (New Radio, NR) in a $5^{th}$ generation access system standard supports higher transmission bandwidth and more transceiver antenna arrays, and has a higher transmission rate and a more flexible scheduling mechanism with a smaller granularity. The foregoing features of the NR provide a broader application range, but greatly increase power consumption of a terminal device.

In a $3^{rd}$ generation partnership project ($3^{rd}$ generation partnership project, 3GPP) R16 protocol, a cross-slot scheduling solution is to be introduced to reduce power consumption of a terminal device. To be specific, a network configures minimum values of K0 and K2 for the terminal device, both K0 and K2 are greater than 0, and the minimum values of K0 and K2 are referred to as minK0 or minK2. After the terminal device receives the configuration, the terminal device may consider that in minK0 slots after scheduling downlink control information (downlink control information, DCI) is received, there is no physical downlink shared channel (physical downlink shared channel, PDSCH) scheduled by the scheduling DCI, and in minK2 slots after the scheduling DCI is received, there is no physical uplink shared channel (physical uplink shared channel, PUSCH) scheduled by the scheduling DCI. Downlink scheduling is used as an example. The terminal device may prolong a parsing time of the scheduling DCI to minK0 slots and does not need to buffer received downlink data in the minK0 slots. Because the available parsing time of the DCI is prolonged, the terminal device may reduce a working frequency of a signal processing component to parse the DCI, to reduce power consumption.

When a plurality of bandwidth parts (bandwidth part, BWP) are configured for the terminal device, a bandwidth part switch delay ($T_{BWPswitchDelay}$) needs to be met for BWP switching. Because the terminal device does not know, before parsing the DCI, whether the DCI includes a BWP switching command, even if minK0>0 is configured for the terminal device by the network device, the terminal device cannot relax a DCI processing time limit. Therefore, power consumption cannot be reduced through cross-slot scheduling.

SUMMARY

This application provides a wireless communication method, device, and system, so that more energy can be saved for a terminal device.

According to a first aspect, a wireless communication method is provided and includes: A terminal device receives first information sent by a network device, where the terminal device currently uses a first BWP, and the first information indicates that in minK0 time units after the terminal device receives scheduling downlink control information (DCI), there is no downlink shared channel (PDSCH) scheduled by the scheduling DCI, and/or in minK2 time units after the terminal device receives the scheduling DCI, there is no physical uplink shared channel (PUSCH) scheduled by the scheduling DCI; the terminal device receives the scheduling DCI sent by the network device, where the scheduling DCI indicates the terminal device to switch from the first BWP to a target BWP; and the terminal device determines a first time period based on a bandwidth part (BWP) switch delay and the first information, where the delay includes N time units. After the first time period since the terminal device receives the scheduling DCI, the terminal device has a capability of receiving the PDSCH or sending the PUSCH on the target BWP.

According to this embodiment of this application, the network device configures, for the terminal device, a minimum scheduling latency (minK0, minK2) and the BWP switch delay of the terminal device. The first time period may be determined based on the delay and the minimum scheduling latency, to ensure a gain of DCI parsing time relaxing of the terminal device during the BWP switching, so that power consumption of the terminal device is reduced.

With reference to the first aspect, in some implementations of the first aspect, duration of the first time period is T1 time units, and T1 is a value of a larger one of N and minK0.

Optionally, T1 may alternatively be a value of a larger one of N and minK2.

According to this embodiment of this application, the terminal device may determine the first time period based on the delay and the minimum scheduling latency. In this way, even if the minimum scheduling latency is greater than the BWP switch delay, the terminal device can still prolong a parsing time of the scheduling DCI based on minK0, or relax a data preparation time based on minK2. In this way, a requirement of the terminal device for parsing the scheduling DCI in a BWP switching scenario is relaxed to some extent, and a specific power consumption gain of DCI parsing can be obtained.

With reference to the first aspect, in some implementations of the first aspect, duration of the first time period is T2 time units, and T2 is a value of a sum of N and minK0.

Optionally, T2 may alternatively be a value of a sum of N and minK2.

According to this embodiment of this application, the terminal device may determine the first time period based on the delay and the minimum scheduling latency, and use a sum of the minimum scheduling latency and the BWP switch delay as the first time period. In this way, even if the terminal device performs the BWP switching, the terminal device can still prolong a parsing time of the scheduling DCI based on minK0, or relax a data preparation time based on minK2, to ensure a gain of a DCI parsing time relaxing brought by the minimum scheduling latency during the BWP switching, so that power consumption of the terminal device is reduced.

With reference to the first aspect, in some implementations of the first aspect, the first time period is T3 time units, and T3 is a value of a sum of N and a larger one of minK0 and minK2.

According to this embodiment of this application, the terminal device may determine the first time period based on the delay and the minimum scheduling latency, and use the value of the sum of N and the larger one of minK0 and minK2 as duration of the first time period. In this way, even if the terminal device performs the BWP switching, the terminal device can still prolong the parsing time of the scheduling DCI based on the larger one of minK0 and minK2, to ensure a gain of DCI parsing time relaxing brought by the minimum scheduling latency during the BWP switching, so that power consumption of the terminal device is reduced.

With reference to the first aspect, in some implementations of the first aspect, duration of the first time period is T4 time units, T4 is a value of a difference obtained by subtracting T5 from a sum of minK0 and N, and T5 is the parsing time used by the terminal device to parse the scheduling DCI.

Optionally, T4 may alternatively be a value of a difference obtained by subtracting T5 from a sum of minK2 and N.

According to this embodiment of this application, the terminal device may determine the first time period based on the delay and the minimum scheduling latency and subtract a repeated parsing time from the first time period, so that no additional delay is introduced while relaxing of the parsing time of the scheduling DCI that is brought by the minimum scheduling latency is ensured; in other words, power consumption is reduced, but no excessive delay is introduced.

According to a second aspect, a wireless communication method is provided and includes: A network device determines a BWP switch delay based on second information sent by a terminal device, where the delay includes N time units; the network device sends first information to the terminal device, where the terminal device currently uses a first BWP, and the first information indicates that in minK0 time units after the terminal device receives scheduling DCI, there is no downlink shared channel (PDSCH) scheduled by the scheduling DCI, and/or in minK2 time units after the terminal device receives the scheduling DCI, there is no physical uplink shared channel (PUSCH) scheduled by the scheduling DCI; the network device sends the scheduling DCI to the terminal device, where the scheduling DCI indicates the terminal device to switch from the first BWP to a target BWP; the network device determines a first time period based on the delay and the first information; and after the first time period since the terminal device receives the scheduling DCI, the network device sends the PDSCH to the terminal device on the target BWP, or the network device receives the PUSCH from the terminal device on the target BWP.

With reference to the second aspect, in some implementations of the second aspect, duration of the first time period is T1 time units, and T1 is a value of a larger one of N and minK0.

Optionally, T1 may alternatively be a value of a larger one of N and minK2.

With reference to the second aspect, in some implementations of the second aspect, duration of the first time period is T2 time units, and T2 is a value of a sum of N and minK0.

Optionally, T2 may alternatively be a value of a sum of N and minK2.

With reference to the second aspect, in some implementations of the second aspect, the first time period is T3 time units, and T3 is a value of a sum of N and a larger one of minK0 and minK2.

With reference to the second aspect, in some implementations of the second aspect, duration of the first time period is T4 time units, T4 is a value of a difference obtained by subtracting T5 from a sum of minK0 and N, and T5 is a parsing time used by the terminal device to parse the scheduling DCI.

Optionally, T4 may alternatively be a value of a difference obtained by subtracting T5 from a sum of minK2 and N.

According to a third aspect, a terminal device is provided and includes: a receiving module, a processing module, and a sending module. The receiving module is configured to receive first information sent by a network device, where the first information indicates that in minK0 time units after the terminal device receives scheduling DCI, there is no PDSCH scheduled by the scheduling DCI, and/or in minK2 time units after the terminal device receives the scheduling DCI, there is no PUSCH scheduled by the scheduling DCI. The receiving module is further configured to receive the scheduling DCI sent by the network device, where the scheduling DCI indicates the terminal device to switch from the first BWP to a target BWP. The processing module is configured to determine a first time period based on a BWP switch delay and the first information, where the delay includes N time units. The sending module is configured to send the PUSCH on the target BWP after the first time period since the scheduling DCI is received. The receiving module is further configured to receive the PDSCH on the target BWP after the first time period since the scheduling DCI is received.

With reference to the third aspect, in some implementations of the third aspect, duration of the first time period is T1 time units, and T1 is a value of a larger one of N and minK0.

Optionally, T1 may alternatively be a value of a larger one of N and minK2.

With reference to the third aspect, in some implementations of the third aspect, duration of the first time period is T2 time units, and T2 is a value of a sum of N and minK0.

Optionally, T2 may alternatively be a value of a sum of N and minK2.

With reference to the third aspect, in some implementations of the third aspect, the first time period is T3 time units, and T3 is a value of a sum of N and a larger one of minK0 and minK2.

With reference to the third aspect, in some implementations of the third aspect, duration of the first time period is T4 time units, T4 is a value of a difference obtained by subtracting T5 from a sum of minK0 and N, and T5 is the parsing time used by the terminal device to parse the scheduling DCI.

Optionally, T4 may alternatively be a value of a difference obtained by subtracting T5 from a sum of minK2 and N.

According to a fourth aspect, a network device is provided and includes: a receiving module, a sending module, and a processing module. The receiving module is configured to receive second information sent by a terminal device, where the second information indicates a BWP switch delay of the terminal device, and the delay includes N time units. The sending module is configured to send first information to the terminal device, where the first information indicates that in minK0 time units after the terminal device receives scheduling DCI, there is no PDSCH scheduled by the scheduling DCI, and/or in minK2 time units after the terminal device receives the scheduling DCI, there is no PUSCH scheduled by the scheduling DCI. The sending module is further configured to send the scheduling DCI to the terminal device, where the scheduling DCI indicates the terminal device to switch from a first BWP to a target BWP. The processing module is configured to determine a first time period based on the delay and the first information. The sending module is further configured to send, on the target BWP, the PDSCH to the terminal device after the first time period since the terminal device receives the scheduling DCI. The receiving module is further configured to receive, on the target BWP after the first time period since the terminal device receives the scheduling DCI, the PUSCH sent by the terminal device.

With reference to the fourth aspect, in some implementations of the fourth aspect, duration of the first time period is T1 time units, and T1 is a value of a larger one of N and minK0.

Optionally, T1 may alternatively be a value of a larger one of N and minK2.

With reference to the fourth aspect, in some implementations of the fourth aspect, duration of the first time period is T2 time units, and T2 is a value of a sum of N and minK0.

Optionally, T2 may alternatively be a value of a sum of N and minK2.

With reference to the fourth aspect, in some implementations of the fourth aspect, the first time period is T3 time units, and T3 is a value of a sum of N and a larger one of minK0 and minK2.

With reference to the fourth aspect, in some implementations of the fourth aspect, duration of the first time period is T4 time units, T4 is a value of a difference obtained by subtracting T5 from a sum of minK0 and N, and T5 is the parsing time used by the terminal device to parse the scheduling DCI.

Optionally, T4 may alternatively be a value of a difference obtained by subtracting T5 from a sum of minK2 and N.

According to a fifth aspect, a network system is provided. The network system includes at least one terminal device according to the third aspect and at least one network device according to the fourth aspect. According to a sixth aspect, a computer-readable storage medium is provided. The computer-readable storage medium stores instructions; and when the instructions are run on a computer, the computer is enabled to perform the methods according to the foregoing aspects.

According to a seventh aspect, a computer program product including instructions is provided, and when the computer program product runs on a computer, the computer is enabled to perform the methods according to the foregoing aspects.

According to an eighth aspect, a chip apparatus is provided, and when the chip apparatus runs, the chip apparatus may perform the methods according to the foregoing aspects.

DESCRIPTION OF EMBODIMENTS

The following describes the technical solutions of this application with reference to the accompanying drawings.

Figure 1:
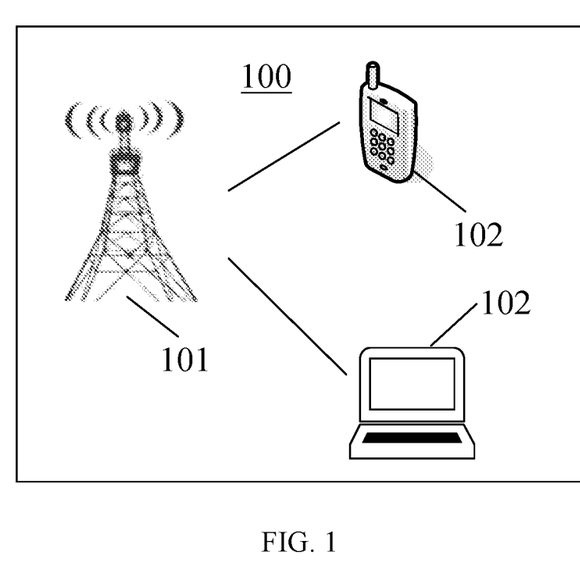
FIG. 1 is a schematic architectural diagram of a communication system to which an embodiment of this application is applicable.

FIG. 1 is a schematic architectural diagram of a mobile communication system to which an embodiment of this application is applicable.

As shown in FIG. 1, a mobile communication system 100 may include a network device 101 and at least one terminal device 102. FIG. 1 is merely a schematic diagram. The communication system may further include another network device, and for example, may further include a wireless relay device and a wireless backhaul device, which are not shown in FIG. 1. Quantities and specific types of network devices and terminal devices included in the mobile communication system are not limited in the embodiments of this application.

A terminal device 102 in the embodiments of this application may be referred to as user equipment, an access terminal, a subscriber unit, a subscriber station, a mobile station, a remote station, a remote terminal, a mobile device, a user terminal, a terminal, a wireless communication device, a user agent, or a user apparatus. The terminal device may alternatively be a cellular phone, a cordless phone, a session initiation protocol (session initiation protocol, SIP) phone, a wireless local loop (wireless local loop, WLL) station, a personal digital assistant (personal digital assistant, PDA), a handheld device having a wireless communication function, a computing device, another processing device connected to a wireless modem, a vehicle-mounted device, a wearable device, a terminal device in a 5G network, a terminal device in a future evolved public land mobile network (public land mobile network, PLMN), or the like. This is not limited in the embodiments of this application.

The network device 101 in this embodiment of this application may be a device configured to communicate with the terminal device, and the network device may be a radio controller in a cloud radio access network (cloud radio access network, CRAN) scenario, or the network device may be a relay station, an access point, a vehicle-mounted device, a wearable device, a network device in a 5G network, a network device in a future evolved PLMN network, or the like. This is not limited in this embodiment of this application.

Downlink control information (downlink control information, DCI) is carried on a PDCCH, and includes resource allocation and other control information on one or more terminal devices.

Search space (search space, SS) is a set of PDCCH candidates (PDCCH candidates) at a specific aggregation level (aggregation level, AL). Because an aggregation level of a PDCCH actually sent by a network device changes with time, and there is no related signaling used to notify a terminal device, the terminal device needs to blindly detect a PDCCH at different aggregation levels, where the PDCCH that is to be blindly detected is referred to as a PDCCH candidate. There may be a plurality of PDCCH candidates at one aggregation level. The terminal device decodes, in the search space, all PDCCH candidates including a control channel element (control-channel element, CCE). If a cyclic redundancy check (cyclic redundancy check, CRC) succeeds, it is considered that content of the decoded PDCCH is valid for the terminal device, and decoded related information is processed.

A concept of BWP is introduced into NR. The BWP is a segment of continuous frequency resources on a cell carrier, and the network device may configure BWPs of different bandwidth sizes for different terminal devices. After a BWP is configured and activated, the BWP is referred to as an active (active) BWP. Data and control information that are sent by the terminal device on an uplink or data and control information that are received on a downlink are limited in the active BWP.

To enable the terminal device to transmit and receive data on different BWPs at different moments based on a service requirement, the NR supports using DCI to trigger the terminal device to perform BWP switching.

Generally, DCI for scheduling data is referred to as scheduling (scheduling) DCI. The DCI may be DCI for scheduling the terminal device to receive downlink PDSCH data, and a format of the DCI is a DCI format 1_1; or the DCI may alternatively be DCI for scheduling the terminal device to send uplink PUSCH data, and a format of the DCI is a DCI format 0_1. After receiving the scheduling DCI, the terminal device switches to a target BWP indicated by the scheduling DCI and receives or sends data.

It should be understood that after the scheduling DCI is parsed, the scheduling DCI may carry indication information to indicate the target BWP, or may not carry information to indicate the target BWP. When the scheduling DCI carries the indication information, the terminal device performs BWP switching according to the indication information. When the scheduling DCI does not carry the indication information, the terminal device schedules data based on the scheduling DCI. In all the following embodiments, the scheduling DCI carries the indication information, and indicates the terminal device to perform BWP switching.

Figure 2:
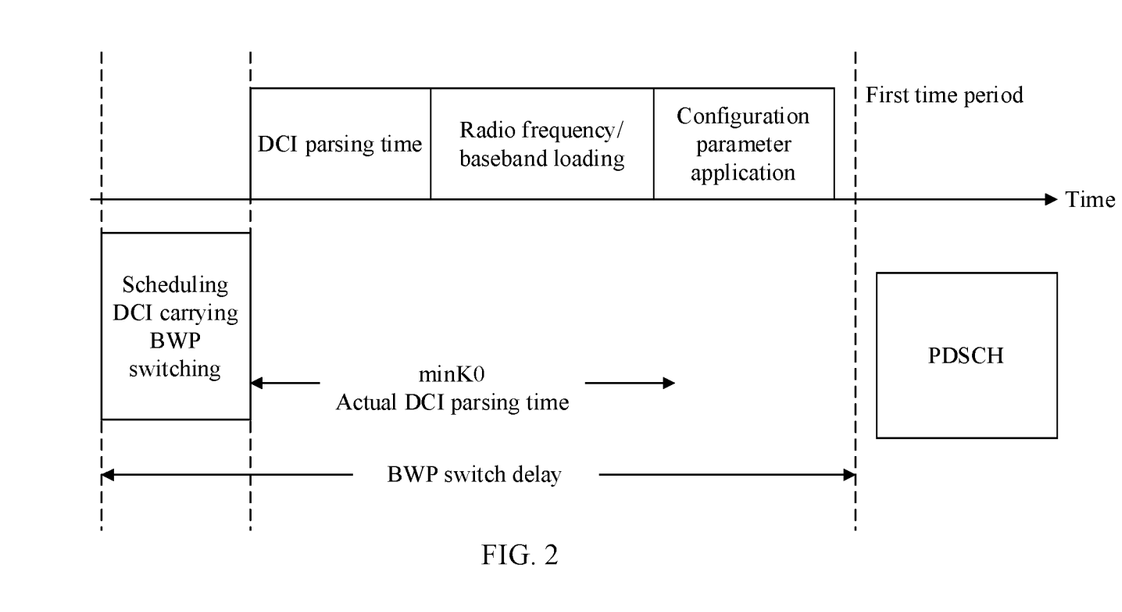
FIG. 2 is a schematic diagram of a BWP switching process of a terminal device according to an embodiment of this application.

FIG. 2 is a schematic diagram of BWP switching of a terminal device according to an embodiment of this application.

Before the terminal device receives scheduling DCI, a network device may configure a time domain resource allocation list (time domain resource allocation list) for the terminal device by using first information. The time domain resource allocation list includes a time offset between the scheduling DCI and a scheduled PDSCH or between a PDCCH and a scheduled PUSCH, and includes a time unit offset and a start symbol and a length of the PDSCH or the PUSCH in a time unit. The network device may configure a set of values of a plurality of time unit offsets for the terminal device, where minK0 and minK2 may be minimum values in a set to which minK0 and minK2 belong, and both minK0 and minK2 are greater than 0. After receiving the first information, the terminal device performs related configuration. After the terminal device performs configuration, in minK0 time units after the scheduling DCI is received, there is no PDSCH scheduled by the scheduling DCI, in other words, minK0 is a minimum scheduling latency for the PDSCH; and in minK2 time units after the scheduling DCI is received, there is no PUSCH scheduled by the scheduling DCI, in other words, minK2 is a minimum scheduling latency for the PUSCH.

minK0 may mean that the terminal device parses the scheduling DCI in the minK0 time units, and minK2 may mean that the terminal device parses the scheduling DCI and prepares to upload data in the minK2 time units.

Optionally, the time unit may be a slot (slot) or another time unit in a communication process.

Optionally, the first information may be radio resource control (radio resource control, RRC) information.

As shown in FIG. 2, a BWP may be switched based on the following steps:

(1) The terminal device receives the scheduling DCI and parses a BWP switching instruction within a parsing time of DCI, where the parsing time of the DCI may be minK0 time units.

Optionally, the terminal device may determine, based on a format of the received DCI, whether the DCI is the scheduling DCI.

(2) Switch a radio frequency component and a baseband component in the terminal device to a target BWP, where operations such as center frequency switching and sampling rate switching may be included.

(3) The terminal device applies a configuration parameter to the target BWP and works normally.

Optionally, after applying the configuration parameter, the terminal device may have a capability of receiving a PDSCH or sending a PUSCH; in other words, the terminal device can receive a PDSCH or send a PUSCH.

It should be understood that a processing time is required to complete BWP switching, and the processing time is referred to as a BWP switch delay ($T_{BWPswitchDelay}$). After receiving the scheduling DCI, the terminal device completes the BWP switching after the delay, and the terminal device has the capability of sending a PUSCH or receiving a PDSCH. Two different delay types are defined in the NR based on different terminal device capabilities, as shown in Table 1.

TABLE 1

| NR time unit | | BWP switch delay (time unit) | |
|---|---|---|---|
| μ | (ms) | Type 1 | Type 2 |
| 0 | 1 | 1 | 3 |
| 1 | 0.5 | 2 | 5 |
| 2 | 0.25 | 3 | 9 |
| 3 | 0.125 | 6 | 17 |

μ is a numerology (numerology) index of a carrier for sending the PDCCH, and μ=0, 1, 2, 3 respectively correspond to subcarrier spacings 15 kHz, 30 kHz, 60 kHz, and 120 kHz of the carrier for sending the PDCCH.

It should be understood that the BWP switch delay may include a time unit in which the scheduling DCI is located; in other words, the terminal device receives the scheduling DCI at a moment n, and after n+$T_{BWPswitchDelay}$, the terminal device has the capability of sending a PUSCH or receiving a PDSCH.

It should be understood that the terminal device may send second information to the network device, and the second information may be used to indicate a type of the BWP switch delay of the terminal device; and the network device may determine, based on the second information sent by the terminal device, whether the terminal device supports a type-1 delay or a type-2 delay, to calculate the BWP switch delay of the terminal device.

It should be understood that when the network device configures a plurality of BWPs for the terminal device, and K0 configured for the terminal device is greater than 0, because the scheduling DCI may carry a BWP switch instruction or may not carry a BWP switch instruction, if the scheduling DCI does not include the BWP switch instruction, the terminal may prolong the parsing time of the DCI to a processing time of the minK0 time units, to reduce power consumption. However, if the scheduling DCI carries the BWP switch instruction, once the parsing time of the DCI is prolonged, a time that can be used by the terminal device for radio frequency (radio frequency, RF) and baseband (baseband, BB) processing and a time that can be used by the terminal device to apply a parameter of the target BWP are correspondingly reduced. Therefore, to ensure that the terminal device can be smoothly switched to the target BWP and has a data sending and receiving capability in the time unit, the terminal device actually cannot prolong the parsing time of the DCI and therefore cannot obtain a power saving gain.

This application proposes a BWP switching method. When a plurality of BWPs and a minimum scheduling latency (minK0, minK2) are configured for a terminal device, the terminal device may complete BWP switching in a first time period, so that power consumption is reduced to some extent.

Figure 3:
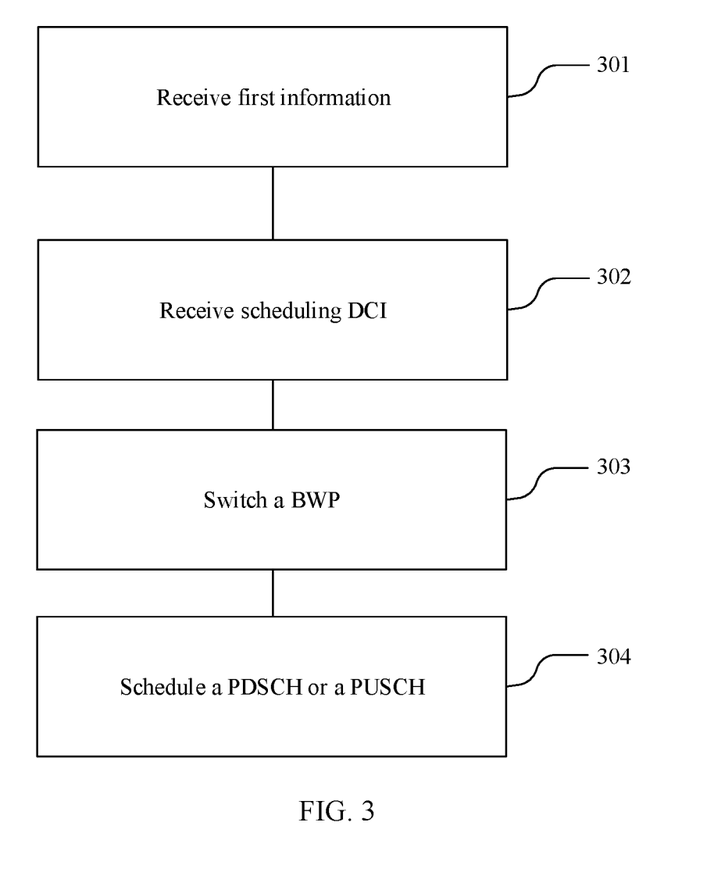
FIG. 3 is a schematic diagram of a wireless communication method according to an embodiment of this application.

FIG. 3 is a schematic diagram of a wireless communication method according to an embodiment of this application. The method in FIG. 3 may be performed by the terminal device 102 in FIG. 1, and the terminal device currently uses a first BWP.

S301: The terminal device receives first information.

The terminal device may receive first information sent by a network device, and the first information may indicate that in minK0 time units after the terminal device receives scheduling DCI, there is no PDSCH scheduled by the scheduling DCI, and/or in minK2 time units after the terminal device receives the scheduling DCI, there is no PUSCH scheduled by the scheduling DCI.

S302: The terminal device receives the scheduling DCI sent by the network device, where the scheduling DCI may indicate the terminal device to switch from the current first BWP to a target BWP.

Optionally, the network device may configure a plurality of BWPs for the terminal device, and may indicate, by using the scheduling DCI, the terminal device to switch to one of the plurality of BWPs.

S303: The terminal device switches to the target BWP.

The terminal device may switch the BWP in a first time period, including parsing the scheduling DCI and determining the target BWP. Switching a radio frequency component and a baseband component to the target BWP may include operations such as center frequency switching and sampling rate switching. The terminal device applies a configuration parameter to the target BWP.

The first time period may be determined based on a BWP switch delay and at least one of minK0 and minK2, and the BWP switch delay may include N time units.

S304: After the first time period since the terminal device receives the scheduling DCI, the terminal device has a capability of receiving a PDSCH or sending a PUSCH on the target BWP.

Alternatively, S304 may be the following step:

After the terminal device receives the scheduling DCI, the terminal device does not receive a PDSCH or send a PUSCH on the target BWP before the first time period expires.

Figure 4:
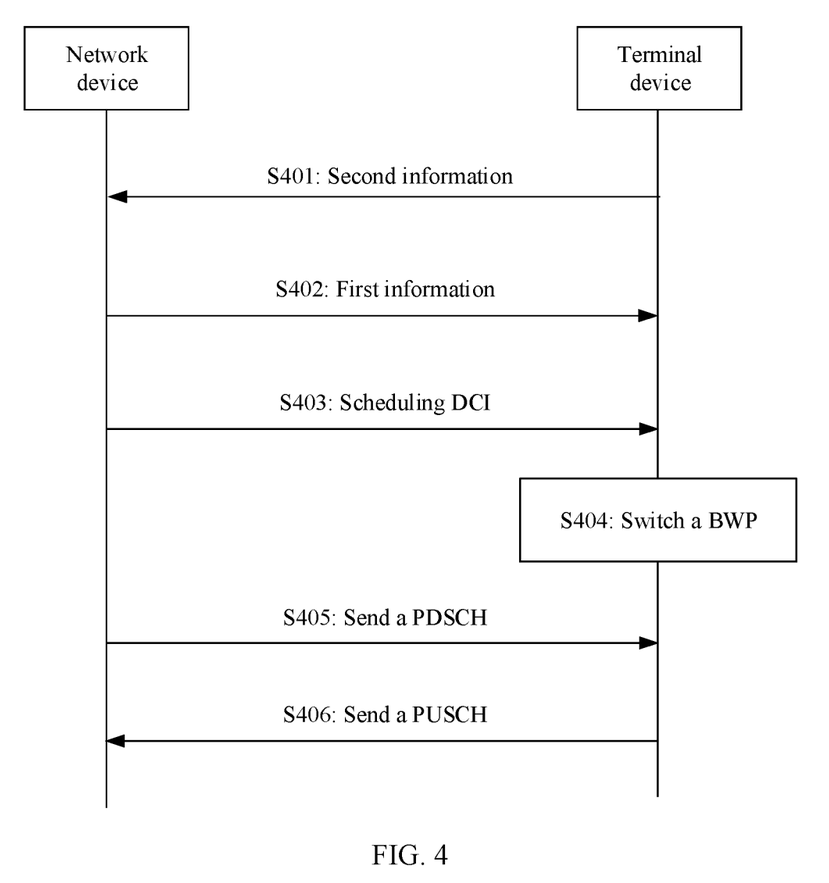
FIG. 4 is a schematic interaction diagram of a wireless communication method according to an embodiment of this application.

FIG. 4 is a schematic interaction diagram of a wireless communication method. The method in FIG. 4 may be performed by the network device 101 and the terminal device 102 in FIG. 1, and the terminal device currently uses a first BWP.

S401: The terminal device sends second information to the network device.

The second information may be used to indicate a type of a BWP switch delay of the terminal device. The network device may determine the BWP switch delay of the terminal device based on the second information. The BWP switch delay may include N time units.

S402: The network device sends first information to the terminal device.

The first information may indicate that in minK0 time units after the terminal device receives scheduling DCI, there is no PDSCH scheduled by the scheduling DCI, and/or in minK2 time units after the terminal device receives the scheduling DCI, there is no PUSCH scheduled by the scheduling DCI.

Optionally, a sequence of S402 and S401 is not limited.

S403: The network device sends the scheduling DCI to the terminal device, where the scheduling DCI may indicate the terminal device to switch from the current first BWP to a target BWP.

Optionally, the network device may configure a plurality of BWPs for the terminal device, and may indicate, by using the scheduling DCI, the terminal device to switch to the target BWP in the plurality of configured BWPs.

S404: The terminal device switches to the target BWP.

The terminal device may switch the BWP in a first time period, including parsing the scheduling DCI and determining the target BWP. Switching a radio frequency component and a baseband component to the target BWP may include operations such as center frequency switching and sampling rate switching. The terminal device applies a configuration parameter to the target BWP.

The first time period may be determined based on the BWP switch delay and at least one of minK0 and minK2.

A sequence of S405 and S406 is not limited in this application. After the first time period since the terminal device receives the scheduling DCI, the terminal device may have a capability of receiving a PDSCH or sending a PUSCH on the target BWP; in other words, after the first time period, the network device may send a PDSCH to the terminal device on the target BWP or receive, on the target BWP, a PUSCH sent by the terminal device.

Optionally, after the terminal device receives the scheduling DCI, the terminal device does not receive a PDSCH or send a PUSCH on the target BWP before the first time period expires.

If the terminal device receives the scheduling DCI, the terminal device may have a capability of receiving a PDSCH or sending a PUSCH on the target BWP after the first time period since the scheduling DCI is received. The first time period may be determined based on the following several methods:

(1) Duration of the first time period may be T1 time units, T1 may be determined based on the BWP switch delay and at least one of minK0 and minK2, and the BWP switch delay may include N time units.

Optionally, T1 may be max(N, minK0); in other words, T1 is a value of a larger one of N and minK0.

Because minK0 time units are a parsing time of the scheduling DCI, and the N time units are the BWP switch delay and include the parsing time of the scheduling DCI, minK0 is generally less than N. However, in some special cases, minK0 that may be configured by the network device for the terminal device is greater than N. In this case, it is ensured that the terminal device can still prolong the BWP switch delay to the minK0 time units, so that a requirement of the terminal device for parsing the scheduling DCI in a BWP switching scenario is relaxed to some extent, and power consumption can be reduced to some extent.

Optionally, T1 may alternatively be max(N, minK2); in other words, T1 is a value of a larger one of N and minK2.

(2) Duration of the first time period may be T2 time units, T2 may be determined based on the BWP switch delay and at least one of minK0 and minK2, and the BWP switch delay may include N time units.

Optionally, T2 may be N+minK0; in other words, T2 is a value of a sum of N and minK0.

Optionally, if only scheduling DCI for a downlink is configured in an SS dedicated to a specific terminal device, and minK0 is also configured for the terminal device, T2 may be N+minK0; in other words, T2 is the value of the sum of N and minK0.

Optionally, if only scheduling DCI for an uplink is configured in an SS dedicated to a specific terminal device, and minK2 is also configured for the terminal device, T2 may be N+minK2; in other words, T2 is the value of the sum of N and minK2.

Optionally, with integrated consideration, if both scheduling DCI for an uplink and scheduling DCI for a downlink are configured in an SS dedicated to a specific terminal device, and minK0 and minK2 are configured for the terminal device, duration of the first time period may be T3 time units, and T3 may be N+max(K0, K2); in other words, T3 is a value of a sum of N and a larger one of minK0 and minK2.

The network device configures a minimum scheduling latency (minK0, minK2) and the BWP switch delay of the terminal device for the terminal device and uses a sum of the minimum scheduling latency and the BWP switch delay as the first time period. In this way, even if the terminal device performs BWP switching, the terminal device can still prolong a parsing time of the scheduling DCI based on minK0, or relax a data preparation time based on minK2, to ensure a gain of DCI parsing time relaxing brought by the minimum scheduling latency during the BWP switching, so that power consumption of the terminal device is reduced.

(3) Duration of the first time period may be T4 time units, T4 may be determined based on the BWP switch delay and at least one of minK0 and minK2, and the BWP switch delay may include N time units.

The BWP switch delay includes a parsing time of the scheduling DCI, a preparation time for a radio frequency component and a baseband component, and a time for applying a configuration parameter. Both minK0 and minK2 include the parsing time of the scheduling DCI. Therefore, in the second case, the first time period includes a time of parsing the scheduling DCI twice. To resolve a problem of repeatedly calculating the parsing time of the scheduling DCI, a parsing time T5 of the scheduling DCI of the terminal device may be predefined. This parameter may be a terminal device capability value reported by the terminal device to the network device, or may be a predefined value.

Optionally, T5 may be a shortest parsing time used by the terminal device to parse the scheduling DCI.

Optionally, T4 may be N+minK0−T5; in other words, T4 is a value of a difference obtained by subtracting T5 from a sum of minK0 and N.

Optionally, T4 may alternatively be N+minK2−T5; in other words, T4 is a value of a difference obtained by subtracting T5 from a sum of minK2 and N.

Optionally, T4 may alternatively be N+max(minK0, minK2)−T5; in other words, T4 is a value of a difference obtained by subtracting T5 from a sum of N and a larger one of minK0 and minK2.

The parsing time T5 of the scheduling DCI is defined on the basis of the second case, and in the second case, T5 is subtracted from the duration of the first time period. In this way, no additional delay is introduced while relaxing of the parsing time of the scheduling DCI brought by the minimum scheduling latency is ensured; in other words, no excessive delays are introduced while power consumption is reduced.

It should be understood that, in an existing NR system, both minK0 and minK2 are directly configured on a PDSCH or a PUSCH of each BWP. Therefore, different minK0 and minK2 may be separately configured on PDSCH and PUSCH channels configured on different BWPs.

In the foregoing embodiments, minK0 and minK2 that are corresponding to a PDSCH and a PUSCH configured on a specific BWP used by the terminal device during BWP switching are not involved. Therefore, an embodiment of this application further provides a method for selecting minK0 and minK2.

minK0 and minK2 may be determined in either of the following two manners:

Manner 1:

minK0 and minK2 are respectively values of minK0 and minK2 configured on a PDSCH and a PUSCH of the first BWP currently used by the terminal device.

Manner 2:

minK0 is a minimum value of minK0 configured on PDSCHs on all BWPs configured for the terminal device:

min $K0$=min(min $K0_i$), where min$K0_i$ is minK0 configured on a PDSCH on an $i^{th}$ BWP configured for the terminal device.

Optionally, if min$K0_i$ is not configured for a BWP in all the BWPs, or min$K0_i$ configured for a specific BWP is equal to 0, the terminal device considers that BWP switch delay processing does not change.

Optionally, all the BWPs may include the first BWP currently used by the terminal device.

Optionally, if min$K0_i$ is represented by using a quantity of slots on the $i^{th}$ BWP as a time unit, and when subcarrier spacings of a plurality of configured BWPs are different (for example, subcarrier spacings corresponding to the first BWP, a second BWP, and a third BWP are respectively 15 kHz, 30 kHz, and 60 kHz), processing is performed based on the following formula:

$$\min K0 = \min\left(\min K0_i \cdot \frac{2^{\mu_0}}{2^{\mu_i}}\right).$$

$\mu_i$ is a subcarrier spacing corresponding to the $i^{th}$ configured BWP, and $\mu_0$ is a subcarrier spacing corresponding to a currently active BWP. The foregoing parameters may be determined by using Table 2.

TABLE 2

| μ | Subcarrier spacing (kHz) |
|---|---|
| 0 | 15 |
| 1 | 30 |
| 2 | 60 |
| 3 | 120 |
| 4 | 240 |

μ is a numerology (numerology) index of a carrier for sending the PDCCH.

Correspondingly, minK2 may be determined as follows by using a same method:

min $K2$=min(min $K2_i$).

min$K2_i$ is minK2 configured on a PUSCH on the $i^{th}$ BWP configured for the terminal device.

Optionally, if minK2$_i$ is represented by using a quantity of slots on the i$^{th}$ BWP as a time unit, and when subcarrier spacings of a plurality of configured BWPs are different, processing is performed based on the following formula:

$$\min K2 = \min\left(\min K2_i \cdot \frac{2^{\mu_0}}{2^{\mu_i}}\right).$$

$\mu_i$ is a subcarrier spacing corresponding to the i$^{th}$ configured BWP, and $\mu_0$ is a subcarrier spacing corresponding to a currently active BWP. The foregoing parameters may be determined by using Table 2.

Figure 5:
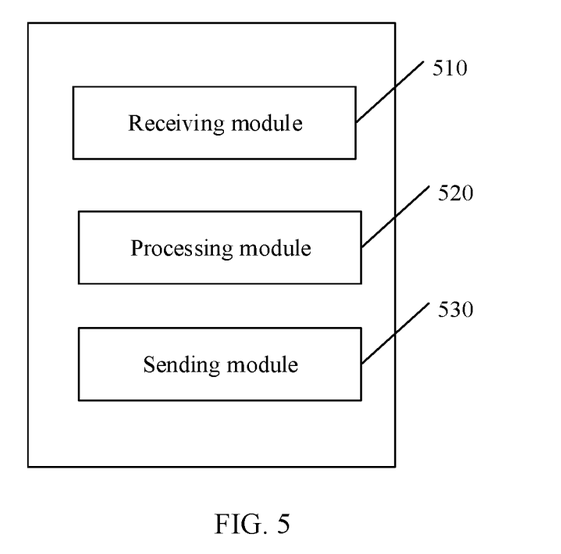
FIG. 5 is a schematic structural diagram of a terminal device according to an embodiment of this application.

FIG. 5 is a schematic structural diagram of a terminal device according to an embodiment of this application. The terminal device is configured to perform corresponding steps in the foregoing method procedure.

As shown in FIG. 5, the terminal device includes a receiving module 510, a processing module 520, and a sending module 530.

The receiving module 510 may be configured to receive first information sent by a network device, where the first information indicates that in minK0 time units after the terminal device receives scheduling DCI, there is no PDSCH scheduled by the scheduling DCI, and/or in minK2 time units after the terminal device receives the scheduling DCI, there is no PUSCH scheduled by the scheduling DCI.

The receiving module may be further configured to receive the scheduling DCI sent by the network device, where the scheduling DCI indicates the terminal device to switch from a first BWP to a target BWP.

The processing module 520 may be configured to determine a first time period based on a BWP switch delay and the first information, where the delay includes N time units.

Optionally, the sending module 530 may be configured to send the PUSCH on the target BWP after the first time period since the scheduling DCI is received. The receiving module is further configured to receive the PDSCH on the target BWP after the first time period since the scheduling DCI is received.

Optionally, the first time period may be in the following cases:

(1) Duration of the first time period is T1 time units, and T1 is a value of a larger one of N and minK0.

Optionally, T1 may alternatively be a value of a larger one of N and minK2.

(2) Duration of the first time period is T2 time units, and T2 is a value of a sum of N and minK0.

Optionally, T2 may alternatively be a value of a sum of N and minK2.

(3) The first time period is T3 time units, and T3 is a value of a sum of N and a larger one of minK0 and minK2.

(4) The first time period is T4 time units, T4 is a value of a difference obtained by subtracting T5 from a sum of minK0 and N, and T5 is a parsing time used by the terminal device to parse the scheduling DCI.

Optionally, T4 may alternatively be a value of a difference obtained by subtracting T5 from a sum of minK2 and N.

The receiving module may be a receiver, and the sending module may be a transmitter. Alternatively, the receiving module and the sending module may be a transceiver. The processing module may be a processor.

Figure 6:
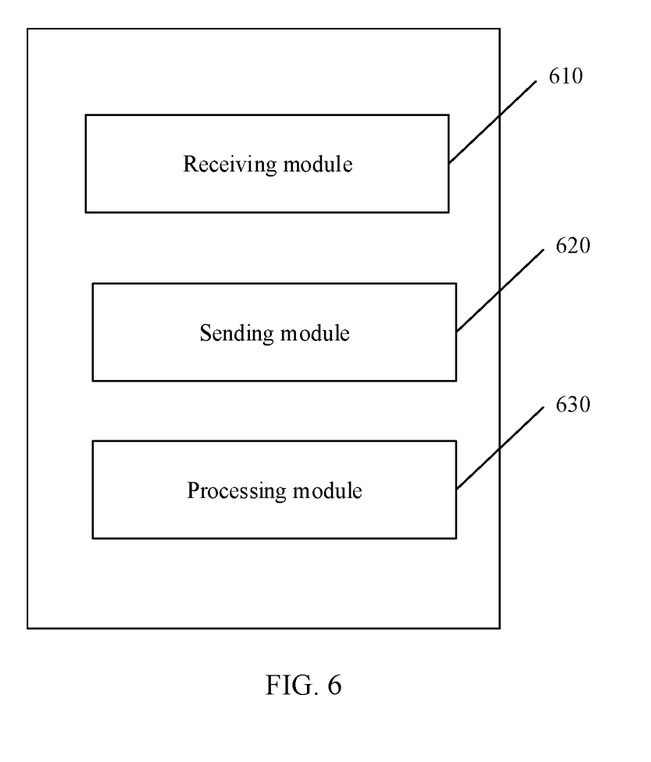
FIG. 6 is a schematic structural diagram of a network device according to an embodiment of this application.

FIG. 6 is a schematic structural diagram of a network device according to an embodiment of this application. The network device is configured to perform corresponding steps in the foregoing method procedure.

As shown in FIG. 6, the network device may include a receiving module 610, a sending module 620, and a processing module 630.

The receiving module 610 may be configured to receive second information sent by a terminal device, where the second information indicates a BWP switch delay of the terminal device, and the delay includes N time units.

The sending module 620 may be configured to send first information to the terminal device, where the first information indicates that in minK0 time units after the terminal device receives scheduling DCI, there is no PDSCH scheduled by the scheduling DCI, and/or in minK2 time units after the terminal device receives the scheduling DCI, there is no PUSCH scheduled by the scheduling DCI.

The sending module 620 may be further configured to send the scheduling DCI to the terminal device, where the scheduling DCI indicates the terminal device to switch from a first BWP to a target BWP.

The processing module 630 may be configured to determine a first time period based on the delay and the first information.

Optionally, the sending module 620 may be further configured to send, on the target BWP, the PDSCH to the terminal device after the first time period since the terminal device receives the scheduling DCI. The sending module 620 may be further configured to receive, on the target BWP after the first time period since the terminal device receives the scheduling DCI, the PUSCH sent by the terminal device.

Optionally, the first time period may be in the following cases:

(1) Duration of the first time period is T1 time units, and T1 is a value of a larger one of N and minK0.

Optionally, T1 may alternatively be a value of a larger one of N and minK2.

(2) Duration of the first time period is T2 time units, and T2 is a value of a sum of N and minK0.

Optionally, T2 may alternatively be a value of a sum of N and minK2.

(3) The first time period is T3 time units, and T3 is a value of a sum of N and a larger one of minK0 and minK2.

(4) The first time period is T4 time units, T4 is a value of a difference obtained by subtracting T5 from a sum of minK0 and N, and T5 is a parsing time used by the terminal device to parse the scheduling DCI.

Optionally, T4 may alternatively be a value of a difference obtained by subtracting T5 from a sum of minK2 and N.

The receiving module may be a receiver, and the sending module may be a transmitter. Alternatively, the receiving module and the sending module may be a transceiver. The processing module may be a processor.

In another implementation, a wireless communication apparatus is provided. The apparatus may be configured to perform steps in the foregoing method procedure. The wireless communication apparatus includes a processor and an interface circuit. When the processor invokes instructions by using the interface circuit, the processor can perform steps in the foregoing method procedure. The instruction may be stored in a storage medium. The storage medium that stores the instruction may be a component of the wireless communication apparatus, or may be located outside the wireless communication apparatus. The wireless communication apparatus may be a terminal device, a network device, or a chip apparatus.

Figure 7:
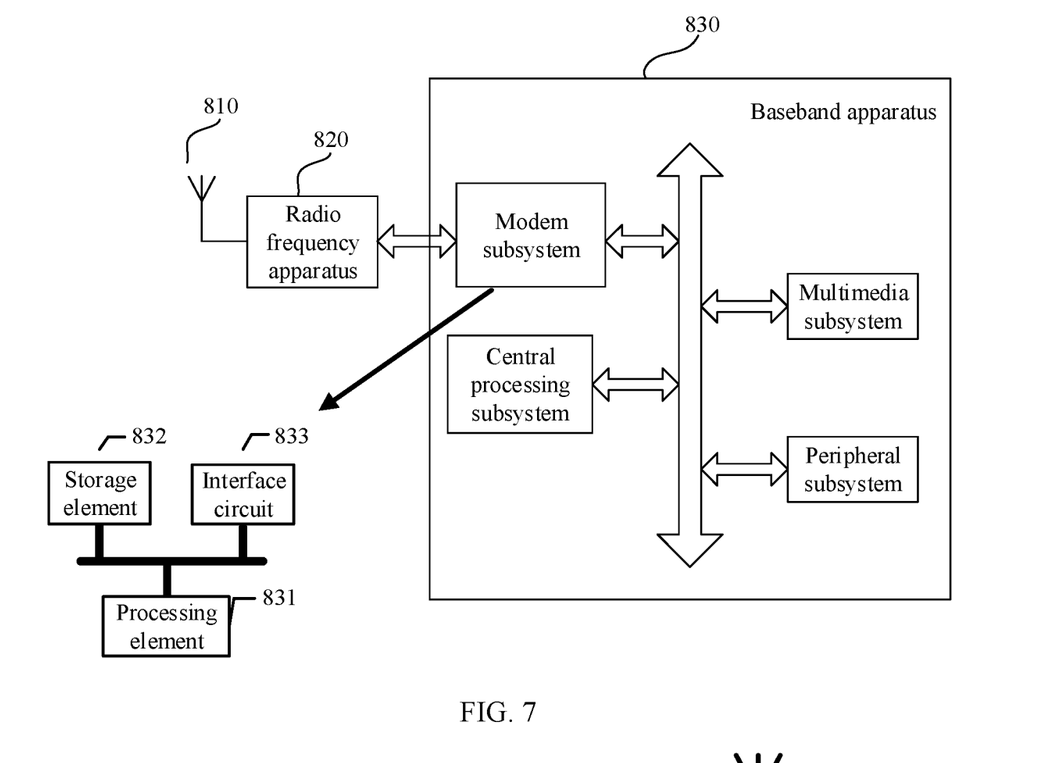
FIG. 7 is a schematic diagram of a terminal device according to an embodiment of this application.

FIG. 7 is a schematic structural diagram of a terminal device according to an embodiment of this application. The terminal device is configured to implement operations of the terminal device in the foregoing embodiments. As shown in FIG. 7, the terminal device includes an antenna 810, a radio frequency apparatus 820, and a baseband apparatus 830. The antenna 810 is connected to the radio frequency apparatus 820. In a downlink direction, the radio frequency apparatus 820 receives, through the antenna 810, information sent by a network device, and sends, to the baseband apparatus 830 for processing, the information sent by the network device. In an uplink direction, the baseband apparatus 830 processes information of the terminal device, and sends the information to the radio frequency apparatus 820; and the radio frequency apparatus 820 processes the information of the terminal device, and then sends the processed information to the network device through the antenna 810.

The baseband apparatus 830 may include a modem subsystem, configured to process data at each communication protocol layer. The baseband apparatus 830 may further include a central processing subsystem, configured to implement processing on an operating system and an application layer of the terminal. In addition, the baseband apparatus 830 may further include another subsystem, for example, a multimedia subsystem or a peripheral subsystem. The multimedia subsystem is configured to control a camera, screen display, and the like of the terminal device, and the peripheral subsystem is configured to implement a connection to another device. The modem subsystem may be an independent chip. Optionally, the foregoing apparatuses used in the terminal device may be located in the modem subsystem.

The modem subsystem may include one or more processing elements 831, for example, include a main control CPU and another integrated circuit. In addition, the modem subsystem may further include a storage element 832 and an interface circuit 833. The storage element 832 is configured to store data and a program, but a program used to perform the method performed by the terminal device in the foregoing methods may not be stored in the storage element 832, but is stored in a memory outside the modem subsystem. The interface circuit 833 is configured to communicate with another subsystem. The foregoing apparatuses used in the terminal device may be located in the modem subsystem, and the modem subsystem may be implemented by using a chip. The chip includes at least one processing element and an interface circuit. The processing element is configured to perform the steps of any one of the methods performed by the terminal device. The interface circuit is configured to communicate with another apparatus. In an implementation, units of the terminal device that implement the steps in the foregoing methods may be implemented by scheduling a program by a processing element. For example, the apparatuses used in the terminal device include a processing element and a storage element. The processing element invokes a program stored in the storage element, to perform the methods performed by the terminal device in the foregoing method embodiments. The processing element invokes a program stored in the storage element, to perform the method performed by the terminal device in the foregoing method embodiments. The storage element may be a storage element that is on the same chip as the processing unit, that is, an on-chip storage element.

Figure 8:
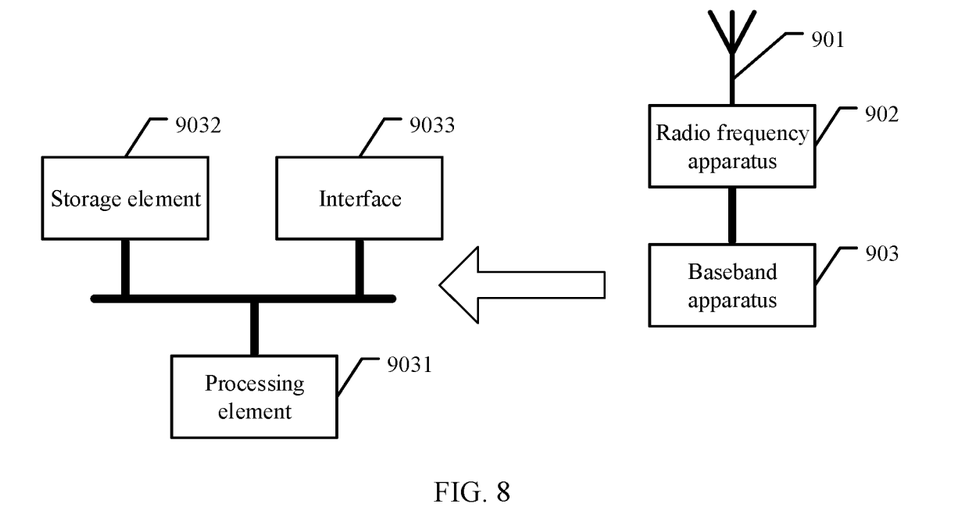
FIG. 8 is a schematic diagram of a network device according to an embodiment of this application.

FIG. 8 is a schematic structural diagram of a network device according to an embodiment of this application. The network device is configured to implement the operations of the network device in the foregoing embodiments. As shown in FIG. 8, the network device includes an antenna 901, a radio frequency apparatus 902, and a baseband apparatus 903. The antenna 901 is connected to the radio frequency apparatus 902. In an uplink direction, the radio frequency apparatus 902 receives, through the antenna 901, information sent by a terminal, and sends, to the baseband apparatus 903 for processing, the information sent by the terminal device. In a downlink direction, the baseband apparatus 903 processes information of the terminal, and sends the information to the radio frequency apparatus 902; and the radio frequency apparatus 902 processes the information of the terminal device, and then sends the processed information to the terminal through the antenna 901.

The baseband apparatus 903 may include one or more processing elements 9031, for example, include a main control CPU and another integrated circuit. In addition, the baseband apparatus 903 may further include a storage element 9032 and an interface 9033. The storage element 9032 is configured to store a program and data. The interface 9033 is configured to exchange information with the radio frequency apparatus 902, and the interface is, for example, a common public radio interface (common public radio interface, CPRI). The foregoing apparatuses used in the network device may be located in the baseband apparatus 903. For example, the foregoing apparatus used in the network device may be a chip in the baseband apparatus 903. The chip includes at least one processing element and an interface circuit. The processing element is configured to perform the steps of any one of the methods performed by the network device. The interface circuit is configured to communicate with another apparatus. In an implementation, units of the network device that implement the steps in the foregoing methods may be implemented by scheduling a program by a processing element. For example, the apparatuses used in the network device include a processing element and a storage element. The processing element invokes a program stored in the storage element, to perform the method performed by the network device in the foregoing method embodiments. The storage element may be a storage element on the same chip as the processing element, that is, an on-chip storage element, or may be a storage element that is on a different chip from the processing element, that is, an off-chip storage element.

A person of ordinary skill in the art may be aware that, in combination with the units and algorithm steps in the examples described in the embodiments disclosed in this specification, this application may be implemented by electronic hardware or a combination of electronic hardware and computer software. Whether the functions are performed by hardware or software depends on particular applications and design constraints of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

In the several embodiments provided in this application, it should be understood that the disclosed system, apparatus, and method may be implemented in other manners. For example, the described apparatus embodiments are merely examples. For example, division into the units is merely logical function division and may be other division during actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, function units in the embodiments of this application may be integrated into one processing unit, each of the units may exist alone physically, or two or more units are integrated into one unit.

All or some of the foregoing embodiments may be implemented by using software, hardware, firmware, or any combination thereof. When software is used to implement the embodiments, the embodiments may be implemented completely or partially in a form of a computer program product. The computer program product includes one or more computer instructions. When the computer program instructions are loaded and executed on a computer, the procedures or functions according to the embodiments of the present invention are all or partially generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible to a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive (Solid State Drive, SSD)), or the like.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A wireless communication method, comprising:
receiving, by a terminal device, first information from a network device, wherein the terminal device currently uses a first bandwidth part (BWP), and the first information indicates at least one of (i) that in a minimum scheduling latency minK0 time units after the terminal device receives scheduling downlink control information (DCI), there is no downlink shared channel (PDSCH) scheduled by the scheduling DCI; or (ii) that in a minimum scheduling latency minK2 time units after the terminal device receives the scheduling DCI, there is no physical uplink shared channel (PUSCH) scheduled by the scheduling DCI;
receiving, by the terminal device, the scheduling DCI from the network device, wherein the scheduling DCI indicates the terminal device to switch from the first BWP to a target BWP; and
determining, by the terminal device, a first time period based on a BWP switch delay and the first information, wherein the BWP switch delay comprises N time units, N is a positive integer; and wherein
after the first time period since the terminal device receives the scheduling DCI, the terminal device has a capability of receiving the PDSCH or sending the PUSCH on the target BWP.

2. The method according to claim 1, wherein duration of the first time period is T1 time units, and T1 is a larger one of N and minK0.

3. The method according to claim 1, wherein duration of the first time period is T2 time units, and T2 is a sum of N and minK0.

4. The method according to claim 1, wherein duration of the first time period is T3 time units, and T3 is a sum of N and a larger one of minK0 and minK2.

5. The method according to claim 1, wherein duration of the first time period is T4 time units, T4 is a value of a difference obtained by subtracting T5 from a sum of minK0 and N, and T5 is a parsing time used by the terminal device to parse the scheduling DCI.

6. A wireless communication method, comprising:
determining, by a network device, a bandwidth part (BWP) switch delay based on second information from a terminal device, wherein the BWP switch delay comprises N time units, N is a positive integer;
sending, by the network device, first information to the terminal device, wherein the terminal device currently uses a first BWP, and the first information indicates at least one of (i) that in a minimum scheduling latency minK0 time units after the terminal device receives scheduling downlink control information (DCI), there is no downlink shared channel (PDSCH) scheduled by the scheduling DCI; or (ii) that in a minimum scheduling latency minK2 time units after the terminal device receives the scheduling DCI, there is no physical uplink shared channel (PUSCH) scheduled by the scheduling DCI;
sending, by the network device, the scheduling DCI to the terminal device, wherein the scheduling DCI indicates the terminal device to switch from the first BWP to a target BWP;
determining, by the network device, a first time period based on the BWP switch delay and the first information; and
after the first time period since the terminal device receives the scheduling DCI, sending, by the network device, the PDSCH to the terminal device on the target BWP, or receiving, by the network device, the PUSCH from the terminal device on the target BWP.

7. The method according to claim 6, wherein duration of the first time period is T1 time units, and T1 is a value of a larger one of N and minK0.

8. The method according to claim 6, wherein duration of the first time period is T2 time units, and T2 is a value of a sum of N and minK0.

9. The method according to claim 6, wherein the first time period is T3 time units, and T3 is a value of a sum of N and a larger one of minK0 and minK2.

10. The method according to claim 6, wherein duration of the first time period is T4 time units, T4 is a value of a difference obtained by subtracting T5 from a sum of minK0 and N, and T5 is a parsing time used by the terminal device to parse the scheduling DCI.

11. A terminal device, wherein the terminal device currently uses a first bandwidth part (BWP), and the terminal device comprises:
- at least one processor; and
- a memory storing programming instructions for execution by the at least one processor, the programming instructions instructing the terminal device to perform operations comprising:
- receiving first information from a network device, wherein the first information indicates at least one of that in a minimum scheduling latency minK0 time units after the terminal device receives scheduling downlink control information (DCI), there is no downlink shared channel (PDSCH) scheduled by the scheduling DCI, or in a minimum scheduling latency minK2 time units after the terminal device receives the scheduling DCI, there is no physical uplink shared channel (PUSCH) scheduled by the scheduling DCI;
- receiving the scheduling DCI from the network device, wherein the scheduling DCI indicates the terminal device to switch from the first BWP to a target BWP; and
- determining a first time period based on a BWP switch delay and the first information, wherein the BWP switch delay comprises N time units, N is a positive integer, and wherein
- after the first time period since the terminal device receives the scheduling DCI, the terminal device has a capability of receiving the PDSCH or sending the PUSCH on the target BWP.

12. The terminal device according to claim 11, wherein duration of the first time period is T1 time units, and T1 is a larger one of N and minK0.

13. The terminal device according to claim 11, wherein duration of the first time period is T2 time units, and T2 is a sum of N and minK0.

14. The terminal device according to claim 11, wherein the first time period is T3 time units, and T3 is a sum of N and a larger one of minK0 and minK2.

15. The terminal device according to claim 11, wherein duration of the first time period is T4 time units, T4 is a difference obtained by subtracting T5 from a sum of minK0 and N, and T5 is a parsing time used by the terminal device to parse the scheduling DCI.

16. A network device, comprising:
- at least one processor; and
- a memory storing programming instructions for execution by the at least one processor, the programming instructions instructing the network device to perform operations comprising:
- receiving second information from a terminal device, wherein the second information indicates a bandwidth part (BWP) switch delay of the terminal device, and the BWP switch delay comprises N time units, N is a positive integer;
- sending first information to the terminal device, wherein the first information indicates at least one of (i) that in a minimum scheduling latency minK0 time units after the terminal device receives scheduling downlink control information (DCI), there is no downlink shared channel (PDSCH) scheduled by the scheduling DCI; or (ii) that in a minimum scheduling latency minK2 time units after the terminal device receives the scheduling DCI, there is no physical uplink shared channel (PUSCH) scheduled by the scheduling DCI; wherein
- sending the scheduling DCI to the terminal device, wherein the scheduling DCI indicates the terminal device to switch from a first BWP to a target BWP;
- determining a first time period based on the BWP switch delay and the first information; and
- sending, on the target BWP, the PDSCH to the terminal device after the first time period since the terminal device receives the scheduling DCI, or receiving, on the target BWP after the first time period since the terminal device receives the scheduling DCI, the PUSCH from the terminal device.

17. The network device according to claim 16, wherein duration of the first time period is T1 time units, and T1 is a larger one of N and minK0.

18. The network device according to claim 16, wherein duration of the first time period is T2 time units, and T2 is a sum of N and minK0.

19. The network device according to claim 16, wherein the first time period is T3 time units, and T3 is a sum of N and a larger one of minK0 and minK2.

20. The network device according to claim 16, wherein duration of the first time period is T4 time units, T4 is a difference obtained by subtracting T5 from a sum of minK0 and N, and T5 is a parsing time used by the terminal device to parse the scheduling DCI.

* * * * *